(12) United States Patent
Fukuda et al.

(10) Patent No.: US 6,708,721 B2
(45) Date of Patent: Mar. 23, 2004

(54) VACUUM VALVE WITH HEATER

(75) Inventors: Mamoru Fukuda, Tsukuba-gun (JP);
Toyonobu Sakurai, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/340,734

(22) Filed: Jan. 13, 2003

(65) Prior Publication Data

US 2003/0178064 A1 Sep. 25, 2003

(30) Foreign Application Priority Data

Mar. 20, 2002 (JP) .................................... 2002-078973

(51) Int. Cl.[7] .............................................. F16K 49/00
(52) U.S. Cl. ...................... 137/341; 137/338; 251/63.5; 251/335.3
(58) Field of Search ................................ 137/341, 338; 251/335.3, 63.5

(56) References Cited

U.S. PATENT DOCUMENTS 3,097,662 A * 7/1963 Peters ......................... 137/338
5,678,595 A * 10/1997 Iwabuchi ..................... 137/341
5,915,410 A * 6/1999 Zajac .......................... 137/341

FOREIGN PATENT DOCUMENTS

JP          3005449          11/1999

* cited by examiner

Primary Examiner—A. Michael Chambers
(74) Attorney, Agent, or Firm—Oblon, Spivak, McClelland, Maier & Neustadt, P.C.

(57) ABSTRACT

A heater and a temperature sensor are mounted to a valve member driven for opening and closing through a piston and a rod, primary conductors extending from the heater and the temperature sensor are connected to a terminal block mounted to the piston, a secondary conductor having a spiral portion for expansion and contraction is connected between the terminal block and a connector mounted to a lid body, and displacements of the primary conductors due to opening and closing of the valve member are absorbed by expansion and contraction of the spiral portion.

8 Claims, 3 Drawing Sheets

VACUUM VALVE WITH HEATER

TECHNICAL FIELD

The present invention relates to a vacuum valve directly used for supplying working fluid such as source gas in physical and chemical machines and the like or used for reducing pressure in a vacuum chamber in which such source gas is used and more specifically relates to a vacuum valve having a heater and formed such that adhesion of a product from the working fluid to a valve member and the like is prevented by the heater.

PRIOR ART

In a manufacturing apparatus of a semiconductor, for example, high-temperature source gas is used for chemical treatment such as etching carried out in a vacuum chamber and a vacuum valve is used for supplying the source gas or for reducing pressure in the vacuum chamber. However, a product is likely to be precipitated out of the source gas when a temperature of the source gas becomes low and the product adheres to an inside of the vacuum valve, the valve member, and the like to reduce an opening/closing accuracy. Therefore, it is important that such a vacuum valve is formed to be able to prevent precipitation of the product out of the working fluid and adhesion of the product to the valve member and the like.

Therefore, conventionally, various vacuum valves with heaters in which a casing, a valve member, and the like are heated by a heater to prevent adhesion of a product are proposed. For example, there is one disclosed in Japanese Patent No. 3005449 in which a rod-shaped heater is mounted to a valve member for opening and closing a flow path and a lead wire of the heater is lead out of a casing through a hollow rod extending from the valve member is disclosed.

However, if the heater is mounted to the movable valve member and the lead wire of the heater is lead outside the casing as it is through the rod as described above, the lead wire is also displaced as the valve member operates and is drawn into or pushed out of the casing. Therefore, the lead wire is likely to be caught on or tangled with an end portion of a lead-through hole of the casing or other members, which tends to hinder opening and closing of the valve member. If the heater has a temperature sensor, a plurality of lead wires for the heater and the temperature sensor are provided and, as a result, the above-described problem is more likely to occur.

If a spiral portion for expansion and contraction is provided to the lead wire to absorb a displacement of the lead wire by expansion and contraction of the spiral portion, the above-described problem can be solved. However, if such a spiral portion is provided, the lead wire becomes long, weight of the lead wire increases, and the weight may adversely affect opening and closing operations of the valve member. If such a spiral portion is provided to a portion of the lead wire inserted through the rod, the spiral portion rubs against the rod every time the valve member opens and closes, the lead wire is likely to be damaged or worn out, and sliding resistance may adversely affect the opening and closing operations of the valve member.

DISCLOSURE OF THE INVENTION

It is a technical object of the present invention to prevent a lead wire extending from a heater from hindering opening and closing of a valve member in a vacuum valve in which the heater for preventing precipitation of a product out of working fluid is provided to the valve member for opening and closing a flow path.

To solve the above problem, there is provided a vacuum valve with a heater according to the invention, the vacuum valve comprising: a valve casing including a first main port, a second main port, a flow path connecting both the main ports, and an annular valve seat provided in the flow path; a cylinder connected to the valve casing; a poppet-type valve member provided in the valve casing to open and close the valve seat; a rod having a tip end portion connected to the valve member and a base end portion extending into the cylinder; a piston disposed for sliding in the cylinder and connected to the base end portion of the rod to be driven by an action of fluid pressure; one or more heaters and temperature sensors mounted to the valve member; a terminal block mounted to the piston to be displaced with the piston; a connector mounted to the cylinder; a heater primary conductor and a sensor primary conductor respectively extending from the heater and the temperature sensor, passing through the rod, and having tip ends connected to the terminal block; a heater secondary conductor and a sensor secondary conductor having one ends respectively connected to the heater primary conductor and the sensor primary conductor through the terminal block, having the other ends connected to the connector, and having a spiral portion for expansion and contraction at an intermediate portion.

According to the vacuum valve of the invention having the above structure, without directly drawing the heater primary conductor and the sensor primary conductor out of the cylinder, the primary conductors are drawn outside through the terminal block mounted to the piston, the connector mounted to the cylinder, and the secondary conductors connected between the terminal block and the connector. The spiral portion for expansion and contraction is provided to the secondary conductors and displacements of the primary conductors due to opening and closing of the valve member are absorbed by expansion and contraction of the spiral portion. As a result, the respective conductors are not drawn into or pushed out of the cylinder. Therefore, the respective conductors are not caught on or tangled with an end portion of a lead-through hole of the cylinder or other members and opening and closing operations of the valve member become stable. Because the spiral portion is provided to the secondary conductors which are not displaced with the valve member, weights of the secondary conductors do not adversely affect the opening and closing operations of the valve member. Moreover, because the spiral portion does not rub against the rod, the conductors are not damaged or worn out and sliding resistances of them do not adversely affect the opening and closing operations of the valve member at all.

According to a preferable structural form of the invention, the heater primary conductor and the sensor primary conductor are inserted into a common tube to form a cable-like primary conductor bunch which is inserted into the rod and the heater secondary conductor and the sensor secondary conductor are inserted into a common tube to form a cable-like secondary conductor bunch which is formed with the spiral portion.

According to this structure, a plurality of conductors are prevented from being locked on or tangled with each other and the opening and closing operations of the valve member are further stabilized.

According to a concrete structural form of the invention, the cylinder includes a driving-side pressure chamber communicating with an operating port on a front face side of the piston and a conductor housing chamber on a back face side of the piston, the terminal block is mounted to a back face of the piston in the conductor housing chamber, a lid body defining the conductor housing chamber is mounted to an end portion of the cylinder, the lid body is mounted with the connector and is provided with a hollow portion, and the spiral portion is housed in the hollow portion.

A coil-shaped return spring is provided between the lid body and the piston in the conductor housing chamber and is provided around a tube portion formed on the lid body to surround the hollow portion such that the return spring is isolated from the spiral portion by the tube portion.

With such a structure, it is possible to make effective use of the lid body to isolate the coil spring from the respective conductors and to reliably and efficiently prevent interference of them with each other.

In the invention, the valve casing further includes at least one of a second heating mechanism for heating an outer face of the valve casing and a third heating mechanism for coming in contact with the valve member in opening of the valve member to heat the valve member. The second heating mechanism includes a heat-transfer cover with which the outer face of the valve casing is covered, one or more second heaters mounted in the heat-transfer cover, and a heat insulating cover disposed around the heat-transfer cover while maintaining a gap therebetween, the third heating mechanism includes a heat-transfer body disposed in a fixed manner in such a position as to surround the rod in the casing, one or more third heaters mounted in the heat-transfer body, and a heat-transfer face formed at a tip end of the heat-transfer body, and the heat-transfer face is formed to come in contact with a heat receiving face of the valve member in opening of the valve member.

DETAILED DESCRIPTION

Figure 1:
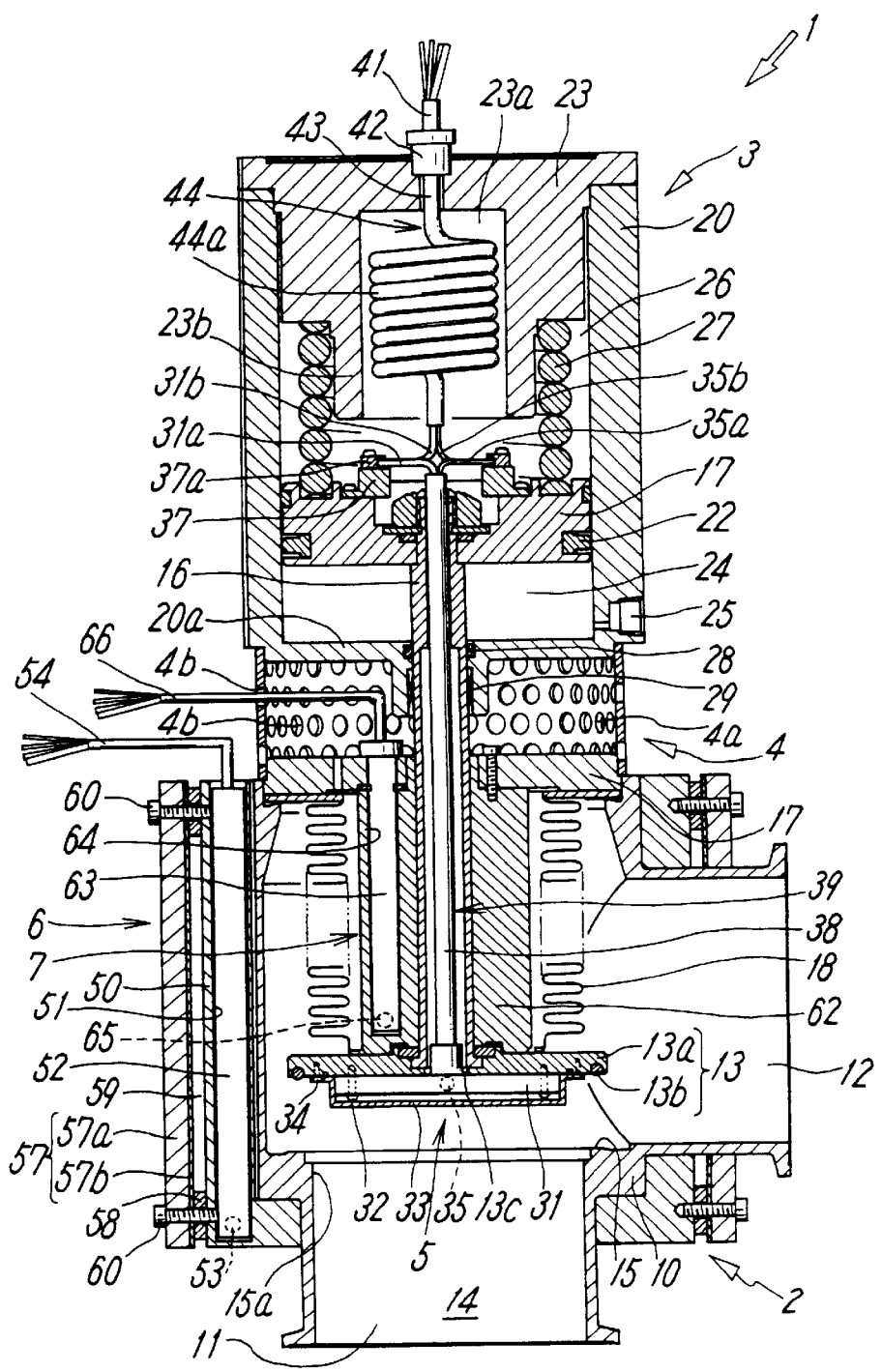
FIG. 1 is a sectional view of a first embodiment of the present invention in an open state of a valve.

FIG. 1 shows a preferred embodiment of a vacuum valve with a heater according to the invention. The vacuum valve 1 is suitable for use for reducing pressure in a vacuum chamber in a semiconductor manufacturing apparatus and includes a valve opening/closing portion 2 formed to open and close a fluid flow path 14 with a valve member 13, a cylinder operating portion 3 for driving the valve member 13, and a heat insulating portion 4 provided between the valve opening/closing portion 2 and the cylinder operating portion 3. The valve opening/closing portion 2 is provided with first to third, i.e., three heating mechanisms 5, 6, and 7.

The valve opening/closing portion 2 has a valve casing 10 made of material such as stainless steel (SUS) in a shape of a square pole. The valve casing 10 has a first main port 11 to be connected to one of the vacuum chamber and a vacuum pump and a second main port 12 to be connected to the other, the first and second main ports 11 and 12 being in orientations at 90° from each other. The valve casing 10 also includes the flow path 14 connecting both the main ports 11 and 12 and an annular valve seat 15 provided in the flow path 14.

In the valve casing 10, the poppet-type valve member 13 for opening and closing the valve seat 15 is provided. The valve member 13 is formed by mounting a rubber sealing member 13b for coming in contact with and separating from the valve seat 15 to an outer periphery of a lower face of a disc-shaped base 13a. A tip end portion of a hollow driving rod 16 is mounted to a central portion of a back face of the valve member 13 and a base end portion of the rod 16 passes through a partition 17 at an end portion of the valve casing 10 and the heat insulating portion 4 and extends to the cylinder operating portion 3 to be connected to a piston 21. Between the back face of the valve member 13 and the partition 17, a bellows 18 for expansion and contraction is mounted to surround the rod 16.

On the other hand, the cylinder operating portion 3 has a cylinder 20 connected to an end portion of the valve casing 10 through the heat insulating portion 4. An end portion of the cylinder 20 on a side of the heat insulating portion 4 is closed with a partition 20a and an opposite end portion of the cylinder 20 is closed with a lid body 23. In the cylinder 20, the piston 21 is housed for sliding through a sealing member 22. The rod 16 passes through a central portion of the partition 20a to slide through a sealing member 28 and a guide member 29 and reaches the piston 21.

On a front side of the piston 21, a driving-side pressure chamber 24 is formed between the piston 21 and the partition 20a and is connected to an operating port 25 provided to a side face of the cylinder 20. On a back side of the piston 21, a return-side pressure chamber 26 is formed between the piston 21 and the lid body 23 and a coil-shaped return spring 27 is provided between the piston 21 and the lid body 23 in the pressure chamber 26.

Figure 2:
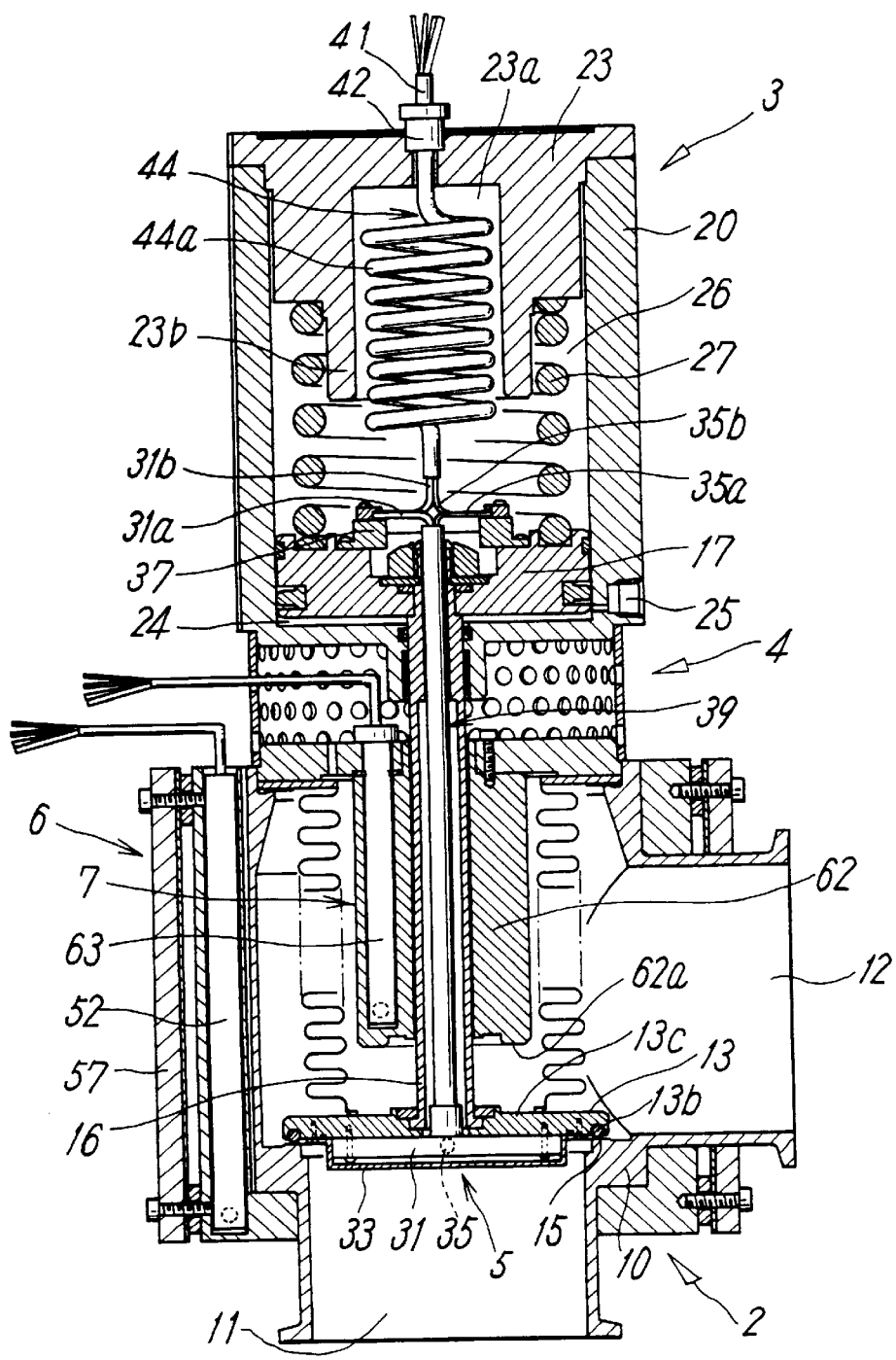
FIG. 2 is a sectional view of the first embodiment in a closed state of the valve.

When pressure fluid such as compressed air is supplied from the operating port 25 into the pressure chamber 24, the piston 21 and the rod 16 move rearward while compressing the return spring 27 as shown in FIG. 1. Therefore, the valve member 13 at the tip end of the rod 16 also moves rearward to open the valve seat 15. When the operating port 25 is opened, as shown in FIG. 2, the piston 21 and the rod 16 move forward due to a repulsing force of the return spring 27 and the valve member 13 is seated on the valve seat 15 to close the valve seat 15.

The first heating mechanism 5 is mounted to the valve member 13. In other words, to a portion of a front face of the valve member 13 positioned in an inner hole 15a of the valve seat 15 and facing the flow path 14 when the valve is closed, one or more first heaters 31 are detachably mounted by screws 32 and a heater cover 33 with which the first heaters 31 is covered is airtightly and detachably mounted by screws 34. A temperature sensor 35 formed of a thermocouple or the like is mounted in the first heater 31 and a heating temperature of the first heater 31 is controlled by a heater control circuit (not shown) by a detection signal from the temperature sensor 35.

Although the first heater 31 is formed by housing an electrical resistance heating element such as a nichrome wire in a metallic hull with an excellent heat-transfer property in an electrically insulated state but may have other structures. A shape of the first heater 31 may be a disc shape, an annular shape, an arc shape, a spiral shape, or a straight-rod shape.

Figure 3:
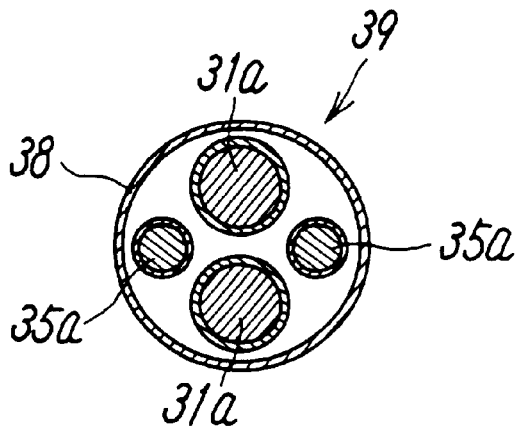
FIG. 3 is a sectional view of a primary conductor bunch.

From the first heaters 31 and the first temperature sensors 35, a plurality of heater primary conductors 31a and sensor primary conductors 35a extend respectively. After these primary conductors 31a and 35a are lead into the hollow rod 16 from a hole 13c at the central portion of the back face of the valve member 13, the conductors 31a and 35a pass through the rod 16 and are lead out into the return-side pressure chamber 26 on a back side of the piston 21 and tip ends of the conductors 31a and 35a are respectively connected to necessary terminals 37a of a terminal block 37 mounted to a back face of the piston 21 to be displaced with the piston 21. These respective conductors 31a and 35a are put together into a cable-like liner primary conductor bunch 39 by being inserted into one tube 38 such as a glass tube preferably having flexibility as can be seen from FIG. 3 and are inserted into a hollow portion of the rod 16 as the primary conductor bunch 39. However, the respective conductors 31a and 35a may be directly inserted into the rod 16 without inserting them into such a tube 38.

At an end of the cylinder 20, a connector 42 to which an outside conductor 41 from the heater control circuit (not shown) can be connected is mounted to a central portion of the lid body 23. To the connector 42 and the terminal block 37, a plurality of heater secondary conductors 31b and sensor secondary conductors 35b are connected. These secondary conductors 31b and 35b are formed separately from the heater primary conductor 31a and the sensor primary conductor 35a. One ends of the secondary conductors 31b and 35b are connected to the respective primary conductors 31a and 35a through the respective terminals 37a of the terminal block 37 and the other ends of the conductors 31b and 35b are connected to the connector 42 to make a junction between the primary conductors 31a and 35a and the connector 42 in the return-side pressure chamber 26. Therefore, the return-side pressure chamber 26 also functions as a chamber for housing the secondary conductors.

The respective secondary conductors 31b and 35b are put together into a cable-like secondary conductor bunch 44 by being inserted into one flexible tube 43 and a spiral portion 44a for expansion and contraction is formed at an intermediate portion of the secondary conductor bunch 44. The spiral portion 44a is housed in a hollow portion 23a formed at a central portion of the lid body 23 and contracts in the hollow portion 23a. At a front end face of the lid body 23 facing the pressure chamber 26, a tube portion 23b surrounding the hollow portion 23a is formed. The return spring 27 is disposed to surround an outer periphery of the tube portion 23b. By the tube portion 23b, the return spring 27 and the secondary conductor bunch 44 are isolated from each other so as not to interfere with each other. The respective secondary conductors 31b and 35b may be disposed as they are without being inserted into the tube 43. In this case, the secondary conductors 31b and 35b are directly formed with the spiral portion 44a.

Thus, the heater primary conductor 31a and the sensor primary conductor 35a are connected to the heater secondary conductor 31b and the sensor secondary conductor 35b through the terminal block 37 and the connector 42 along one straight axis.

According to the present embodiment, without drawing the heater primary conductor 31a and the sensor primary conductor 35a directly out of the cylinder 20, the heater primary conductor 31a and the sensor primary conductor 35a are drawn outside through the terminal block 37 mounted to the piston 21, the connector 42 mounted to the cylinder 20, and the junction secondary conductors 31b and 35b connected therebetween. The spiral portion 44a for expansion and contraction is provided to the secondary conductors 31b and 35b and displacements of the respective primary conductors 31a and 35a caused by opening and closing of the valve member 13 are absorbed by expansion and contraction of the spiral portion 44a. As a result, the respective conductors are not drawn into or pushed out of the cylinder 20. Therefore, the respective conductors are not caught on or tangled with a lead-through hole or other members and opening and closing operations of the valve member 13 become stable. Because the spiral portion 44a is provided to the secondary conductors 31b and 35b which are not housed in the rod 16, weights of the secondary conductors 31b and 35b do not adversely affect the opening and closing operations of the valve member 13. Moreover, because the spiral portion 44a does not rub against the rod 16, the respective conductors 31b and 35b and the tube 43 are not damaged or worn out and sliding resistances of them do not adversely affect the opening and closing operations of the valve member 13.

Figure 4:
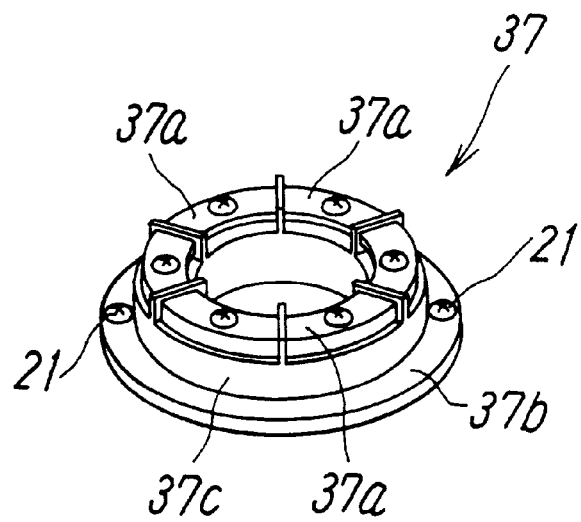
FIG. 4 is a perspective view of a terminal block.

Although the terminal block 37 may be of any structure as far as it can reliably and easily connect the respective conductors, the terminal block 37 shown in the embodiment includes, as can be seen from FIG. 4, a flange-shaped pedestal portion 37b fixed to the piston 21 by screws 46, a circular-cylindrical connecting portion 37c standing from a central portion of the pedestal portion 37b, and the plurality of terminals 37a radially formed at the connecting portion 37c and is of a type in which the respective primary conductors 31a and 35a and the secondary conductors 31b and 35b are connected to the respective terminals 37a.

If the valve member 13 is provided with the hole 13c through which the heater primary conductor 31a and the sensor primary conductor 35a are drawn out as described above, airtightness between front and back faces of the valve member 13 may be lost due to the hole 13c. Therefore, the heater cover 33 is mounted to the front face of the valve member 13 such that the hole 13c, the first heaters 31, and the temperature sensor 35 are airtightly covered with the heater cover 33. By the heater cover 33, the first heaters 31 and the temperature sensor 35 are protected so as not to come in contact with source gas and airtightness between the front and back faces of the valve member 13 is maintained satisfactorily.

Thus, by mounting the first heaters 31 to a portion of the front face of the valve member 13 coming into contact with the source gas and by directly heating the face in contact with the gas, it is possible to reliably prevent adhesion of a by-product due to condensation and the like of the source gas. Moreover, because the first heaters 31 is mounted to the front face of the valve member 13, the first heaters 31 can be exchanged easily in a case of a failure or to change a calorific value by detaching the heater cover 33.

The second heating mechanism 6 is mounted to an outer face of the valve casing 10 and formed as follows. The second heating mechanism 6 has a prism-shaped heat-transfer cover 50 mounted to the valve casing 10 so as to surround the whole outer peripheral face. The heat-transfer cover 50 is made of hard material such as aluminum with excellent thermal conductivity to have a certain degree of wall thickness and mounted in close contact with the outer face of the valve casing 10. The whole heat-transfer cover 50 may be formed integrally or the heat-transfer cover 50 may be formed by combining a plurality of parts, e.g., separate parts respectively corresponding to four sides of the valve casing 10.

Within the wall thickness of the heat-transfer cover 50, a plurality of heater holes 51 are formed in parallel to an axis of the valve casing 10 and a rod-shaped second heater 52 is inserted into each the heater holes 51. Heat from the second heater 52 is evenly dispersed through the heat-transfer cover 50 and is evenly transferred to the entire valve casing 10. The second heater 52 also has a temperature sensor 53 and a cable-like conductor bunch 54 formed by putting conductors from the second heater 52 and the temperature sensor 53 together extends outside and is connected to the heater control circuit (not shown).

The second heaters 52 may be disposed in four corners of the heat-transfer cover 50 or at central portions of the respective sides. The number of the second heaters 52 is not limited to four and may be three or less, five or more, or only one depending on heating conditions.

To an outside of each side of the heat-transfer cover 50, a heat insulating cover 57 for preventing heat transfer from each the side to an outside is mounted. The heat insulating cover 57 is formed by mounting a thin heat diffusing plate 57b having a function of diffusing heat from the heat-transfer cover 50 to an inner face of a heat insulating plate 57a in a shape of a flat plate and made of silicon rubber, fluoric rubber, foamed fluoric rubber, or the like. The heat insulating cover 57 is fixed to each the side of the heat-transfer cover 50 by screws 60 while maintaining a constant gap 59 between the heat-transfer cover 50 and itself by providing a spacer 58 therebetween. In this case, it is preferable that part of the screws 60 of the heat insulating cover 57 is also used for fixing the second heater 52 by bringing tip ends of the screws 60 into contact with the second heater 52.

The heat diffusing plate 57b can be made of heat-transfer material such as aluminum and can be made of other materials. The heat insulating cover 57 may be separated into four parts corresponding to respective sides of the heat-transfer cover 50 or may be formed into an integral body.

Because the second heating mechanism 6 has the above structure, heat from the second heater 52 is evenly dispersed to the entire cover through the heat-transfer cover 50 and is evenly transferred to the entire outer peripheral face of the valve casing 10. As a result, though the valve casing 10 is made of material such as SUS with an inferior heat-transfer property, it is possible to efficiently heat the entire outer peripheral face of the valve casing 10 by the inexpensive rod-shaped heaters 52 through the heat-transfer cover 50.

Furthermore, the third heating mechanism 7 includes the heat-transfer body 62 disposed in the bellows 18 in the valve casing 10 along the rod 16 and one or more third heaters 63 mounted in the heat-transfer body 62. The heat-transfer body 62 is formed into a cylindrical shape by using metal material such as aluminum with an excellent heat-transfer property and is disposed concentrically around the rod 16 with a minute gap maintained therebetween. By fixing a base end portion of the heat-transfer body 62 to the partition 17 by a bolt, the heat-transfer body 62 is disposed in a fixed position in the valve casing 10 in a fixed manner. Within a wall thickness of the heat-transfer body 62, one or more heater holes 64 are formed in parallel to a central axis of the heat-transfer body 62 and the rod-shaped third heaters 63 are mounted in the heater holes 64 in parallel to the rod 16. A tip end portion of the heat-transfer body 62 is formed as an annular heat-transfer face 62a and the heat-transfer face 62a is at a certain distance from and does not come in contact with the valve member 13 which has moved forward to the valve-closing position as shown in FIG. 2 but comes in contact with an annular heat receiving face 13c on a back face of the valve member 13 when the valve member 13 moves rearward in valve opening as shown in FIG. 1.

The third heater 63 also has a temperature sensor 65 and a cable-like conductor bunch 66 formed by putting conductors from the third heaters 63 and the temperature sensors 65 together is lead out through a hole 4b in a side of the heat insulating portion 4. In this case, because the third heaters 63 are not displaced, the conductor bunch 66 does not need to be bent or formed into a coil shape.

The third heating mechanism 7 functions as follows. As shown in FIG. 2, when the valve member 13 closes the valve seat 15, the valve member 13 is at a certain distance from the heat-transfer body 62 and heat from the third heaters 63 is not transferred to the heat receiving face 13c through the heat-transfer body 62. However, when the valve member 13 moves rearward to open the valve seat 15 as shown in FIG. 1, the heat receiving face 13d of the valve member 13 comes in contact with the heat-transfer face 62a at the tip end of the heat-transfer body 62 and heat from the third heaters 63 is transferred from the heat-transfer body 62 and the heat receiving face 13d is heated. As described above, because the valve member 13 is directly heated by the third heaters 63 when the valve member 13 is opened and comes in contact with a large amount of source gas, heating is highly effective and adhesion of the by-product can be reliably prevented. Even though an inside of the bellows 18 breathes to cause a temporary temperature drop by expansion and contraction of the bellows 18 due to the opening and closing operations of the valve member 13, the temperature drop is suppressed to be very small because the inside of the bellows 18 is constantly heated by the third heaters 63 through the heat-transfer body 62 and heating of the valve member 13 to a high temperature is possible.

Furthermore, the heat insulating portion 4 is formed of a cylindrical heat insulating member 4a having a plurality of air vent holes 4b, the heat insulating member 4a is disposed concentrically between the valve casing 10 and the cylinder 20 to surround the rod 16, and the rod 16 is cooled by air circulating in the heat insulating member 4a. In other words, heat transferred from the first heaters 31 and the third heaters 63 to the rod 16 flows from the rod 16 toward the piston 21, but a major part of the heat is intercepted due to heat radiation in the heat insulating portion 4 and little heat is transferred to the piston 21.

Although the vacuum valve includes the first to third three heating mechanisms 5 to 7 in the embodiment, it is also possible that the third heating mechanism 7 is omitted and only the first and second heating mechanisms 5 and 6 may be provided, for example.

The return spring 27 may be provided between the partition 17 and the valve member 13 in the bellows 18 instead of being provided in the return-side pressure chamber 26 behind the piston 21 as shown in the drawings.

The shape of the valve casing 10 is not limited to the square pole and may be a circular-cylindrical shape or other shapes. In this case, it is needless to say that the heat-transfer cover 62 and the heat insulating cover 57 in the second heating mechanism 6 are formed into shapes adaptable to such a shape.

According to the vacuum valve of the invention, without directly drawing out the primary conductors extending from the heater and the temperature sensor provided to the valve member, the primary conductors are drawn out through the secondary conductors. The spiral portion is provided to the secondary conductors and displacements of the primary conductors caused by opening and closing of the valve member are absorbed by expansion and contraction of the spiral portion. As a result, problems in prior art are solved and opening and closing operations of the valve member can be carried out stably.

What is claimed is:

1. A vacuum valve with a heater, the vacuum valve comprising:
   a valve casing including a first main port, a second main port, a flow path connecting both the main ports, and an annular valve seat provided in the flow path;
   a cylinder connected to the valve casing;
   a poppet-type valve member provided in the valve casing to open and close the valve seat;
   a hollow rod having a tip end portion connected to the valve member and a base end portion extending into the cylinder;
   a piston disposed for sliding in the cylinder and connected to the base end portion of the rod to be driven by an action of fluid pressure;
   one or more first heaters and temperature sensors mounted to the valve member;
   a terminal block mounted to the piston to be displaced with the piston;
   a connector mounted to an end portion of the cylinder;
   a heater primary conductor and a sensor primary conductor respectively extending from the first heater and the temperature sensor, passing through the rod, and having tip ends connected to the terminal block;
   a heater secondary conductor and a sensor secondary conductor having one ends respectively connected to the heater primary conductor and the sensor primary conductor through the terminal block, having the other ends connected to the connector, and having a spiral portion for expansion and contraction at an intermediate portion.

2. A vacuum valve according to claim 1, wherein the heater primary conductor and the sensor primary conductor are inserted into a common tube to form a cable-like primary conductor bunch which is inserted into the rod and the heater secondary conductor and the sensor secondary conductor are inserted into a common tube to form a cable-like secondary conductor bunch which is formed with the spiral portion.

3. A vacuum valve according to claim 2, wherein the cylinder has a driving-side pressure chamber communicating with an operating port on a front face side of the piston and a conductor housing chamber on a back face side of the piston, the terminal block is mounted to a back face of the piston in the conductor housing chamber, a lid body defining the conductor housing chamber is mounted to an end portion of the cylinder, the lid body is mounted with the connector and is provided with a hollow portion, and the spiral portion is housed in the hollow portion.

4. A vacuum valve according to claim 3, wherein a coil-shaped return spring is provided between the lid body and the piston in the conductor housing chamber and is provided around a tube portion formed on the lid body to surround the hollow portion such that the return spring is isolated from the spiral portion by the tube portion.

5. A vacuum valve according to claim 1, wherein the cylinder includes a driving-side pressure chamber communicating with an operating port on a front face side of the piston and a conductor housing chamber on a back face side of the piston, the terminal block is mounted to a back face of the piston in the conductor housing chamber, a lid body defining the conductor housing chamber is mounted to an end portion of the cylinder, the lid body is mounted with the connector and is provided with a hollow portion, and the spiral portion is housed in the hollow portion.

6. A vacuum valve according to claim 5, wherein a coil-shaped return spring is provided between the lid body and the piston in the conductor housing chamber and is provided around a tube portion formed on the lid body to surround the hollow portion such that the return spring is isolated from the spiral portion by the tube portion.

7. A vacuum valve according to claim 1, wherein the valve casing further includes at least one of a second heating mechanism for heating an outer face of the valve casing and a third heating mechanism for coming in contact with the valve member in opening of the valve member to heat the valve member.

8. A vacuum valve according to claim 7, wherein the second heating mechanism includes a heat-transfer cover with which the outer face of the valve casing is covered, one or more second heaters mounted in the heat-transfer cover, and a heat insulating cover disposed around the heat-transfer cover while maintaining a gap therebetween, the third heating mechanism includes a heat-transfer body disposed in a fixed manner in such a position as to surround the rod in the casing, one or more third heaters mounted in the heat-transfer body, and a heat-transfer face formed at a tip end of the heat-transfer body, and the heat-transfer face is formed to come in contact with a heat receiving face of the valve member in opening of the valve member.

* * * * *